United States Patent
Jackson

(10) Patent No.: US 10,883,747 B2
(45) Date of Patent: Jan. 5, 2021

(54) TEMPERATURE CONTROL DEVICE AND PROCESS CONTROL APPARATUS INCLUDING A TEMPERATURE CONTROL DEVICE

(71) Applicant: FISHER CONTROLS INTERNATIONAL LLC, Marshalltown, IA (US)

(72) Inventor: Trenton F. Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 182 days.

(21) Appl. No.: 16/059,180

(22) Filed: Aug. 9, 2018

(65) Prior Publication Data
US 2018/0347865 A1    Dec. 6, 2018

Related U.S. Application Data

(62) Division of application No. 14/865,402, filed on Sep. 25, 2015, now Pat. No. 10,113,775.

(51) Int. Cl.
| | |
|---|---|
| *F28B 9/04* | (2006.01) |
| *G05D 23/13* | (2006.01) |
| *F25B 9/04* | (2006.01) |

(52) U.S. Cl.
CPC ............. *F25B 9/04* (2013.01); *G05D 23/134* (2013.01)

(58) Field of Classification Search
CPC ....... F25B 9/04; G05D 23/134; F16K 11/044; F16K 31/002
See application file for complete search history.

(56) References Cited

U.S. PATENT DOCUMENTS

| | | |
|---|---|---|
| 2,737,028 A | 3/1956 | Machlanski |
| 2,819,590 A | 1/1958 | Green |
| 3,165,149 A | 1/1965 | Raible et al. |
| 3,307,366 A | 3/1967 | Smith |

(Continued)

FOREIGN PATENT DOCUMENTS

| | | |
|---|---|---|
| CN | 1126826 A | 7/1996 |
| DE | 102009041799 A1 | 2/2011 |
| JP | S59106777 A | 6/1984 |

OTHER PUBLICATIONS

International Search Report and Written Opinion for Application No. PCT/US2016/053426, dated Nov. 30, 2016.

(Continued)

*Primary Examiner* — Ana M Vazquez
(74) *Attorney, Agent, or Firm* — Marshall, Gerstein & Borun LLP

(57) ABSTRACT

A process control apparatus includes a housing, a process control device disposed in the housing, and a temperature control device operably coupled to the housing for regulating a temperature of an atmosphere internal to the housing. The temperature control device includes a vortex tube and a flow control valve. The flow control valve is coupled to the vortex tube and includes a temperature sensing feature configured to sense a temperature of an atmosphere internal to the housing and configured to move a control element of the flow control valve based on the sensed temperature between a plurality of positions to selectively direct the flow of fluid from the first and second vortex outlets to the atmosphere internal to the housing.

18 Claims, 5 Drawing Sheets

(56) References Cited

U.S. PATENT DOCUMENTS

| | | | |
|---|---|---|---|
| 3,684,237 A | 8/1972 | Hyde et al. |
| 4,112,977 A | 9/1978 | Syred et al. |
| 5,322,043 A | 6/1994 | Shriner et al. |
| 7,234,489 B2 | 6/2007 | Bowe et al. |
| 2002/0062650 A1 | 5/2002 | Dukhan et al. |

OTHER PUBLICATIONS

Office Action issued in Chinese Patent Application No. 201610849337.9, dated Mar. 20, 2019.

TEMPERATURE CONTROL DEVICE AND PROCESS CONTROL APPARATUS INCLUDING A TEMPERATURE CONTROL DEVICE

CROSS-REFERENCE TO RELATED APPLICATIONS

This is a divisional of U.S. patent application Ser. No. 14/865,402, filed on Sep. 25, 2015, the entire contents of which are incorporated herein by reference.

FIELD OF THE DISCLOSURE

This disclosure relates generally to process control systems and, more specifically, to temperature control for process control devices.

BACKGROUND

Process control systems typically include numerous process control field devices, some of which may be exposed to operating environments in which the ambient temperature is relatively high or low, and/or varies widely. Such temperature conditions may have an adverse effect on the operation of the field devices because many of the components of these field devices are designed to work in more moderate environments. Some field devices may be enclosed in protective housings. However, these housings are not effective to prevent the field devices from being affected by extreme temperatures or temperature changes.

SUMMARY

One aspect of the present disclosure provides a process control apparatus including a housing a process control device in the housing, and a a temperature control device operably coupled to the housing for regulating a temperature of an atmosphere internal to the housing. The temperature control device can include a vortex tube and a flow control valve. The vortex tube can have a vortex inlet for receiving a compressed fluid, a first vortex outlet for discharging fluid from the vortex tube at a first temperature, and a second vortex outlet for discharging fluid from the vortex tube at a second temperature that is higher than the first temperature. The flow control valve can be coupled to the vortex tube to selectively direct the flow of fluid from the first and second vortex outlets of the vortex tube. The flow control valve can include a valve body and a movable control element. The valve body can define a valve cavity, a first valve inlet in communication with the valve cavity and the first vortex outlet of the vortex tube, a second valve inlet in communication with the valve cavity and the second vortex outlet of the vortex tube, a first valve outlet in communication with the valve cavity and an atmosphere external to the housing, and a second valve outlet in communication with the valve cavity and the atmosphere internal to the housing. The movable control element can be disposed in the valve cavity for selectively controlling the flow of fluid from the first and second vortex outlets and the atmosphere internal to the housing.

In some versions, the temperature control device can further include a temperature sensing feature disposed in the housing for controlling movement of the movable control element.

In some versions, the temperature sensing feature can be disposed in the flow control valve and the flow control valve is disposed in the housing.

In some versions, the temperature sensing feature can include a reservoir of a control fluid that expands in response to an increase in the temperature of the atmosphere internal to the housing and contracts in response to a decrease in the temperature of the atmosphere internal to the housing.

In some versions, the valve body can include a third valve outlet in communication with valve cavity and the atmosphere external to the housing, the second valve outlet being disposed between the first and third valve outlets.

In some versions, the control element can include a stem and first and second plugs disposed toward opposite ends of the stem, each of the first and second plugs disposed in sealed sliding relationship with an internal surface of the valve cavity of the valve body of the flow control valve.

In some versions, the control element can be movable in the valve cavity between a first position, a second position, and a third position. When the control element occupies the first position, the first and second vortex outlets are both in fluid communication with the second valve outlet but not in fluid communication with the first and third valve outlets. When the control element occupies the second position, the first vortex outlet is in fluid communication with the first valve outlet but not the second and third valve outlets, and the second vortex outlet is in fluid communication with the second valve outlet but not the first and third valve outlets. When the control element occupies the third position, the first vortex outlet is in fluid communication with the second valve outlet but not the first and third valve outlets, and the second vortex outlet is in fluid communication with the third valve outlet but not the first and second valve outlets.

In some other versions, the control element can be movable in the valve cavity between a first position, a second position, and a third position. When the control element occupies the first position, the first and second valve inlets are sealed closed by the first and second valve plugs, respectively, of the control element such that the first and second vortex outlets are not in fluid communication with any of the first, second, and third valve outlets. When the control element occupies the second position, the first vortex outlet is in fluid communication with the first valve outlet but not the second and third valve outlets, and the second vortex outlet is in fluid communication with the second valve outlet but not the first and third valve outlets. When the control element occupies the third position, the first vortex outlet is in fluid communication with the second valve outlet but not the first and third valve outlets, and the second vortex outlet is in fluid communication with the third valve outlet but not the first and second valve outlets.

In some versions, the flow control valve can include a biasing member disposed in the valve cavity and biasing the control element toward the second position.

In some versions, a fluid source can be provided to deliver the compressed fluid to the vortex inlet of the vortex tube.

In some versions, the fluid source can be a fluid diverted from a fluid supply for the process control apparatus.

Another aspect of the present disclosure provides a temperature control device for controlling a temperature of a process control apparatus. The temperature control device can include a vortex tube and a flow control valve. The vortex tube can have a vortex inlet for receiving a compressed fluid, a first vortex outlet for discharging fluid from the vortex tube at a first temperature, and a second vortex outlet for discharging fluid from the vortex tube at a second temperature that is higher than the first temperature. The flow control valve can be coupled to the vortex tube to selectively direct the flow of fluid from the first and second vortex outlets of the vortex tube. The flow control valve can include a valve body and a control element. The valve body can define a valve cavity, a first valve inlet in communication with the valve cavity and the first vortex outlet of the vortex tube, a second valve inlet in communication with the valve cavity and the second vortex outlet of the vortex tube, a first valve outlet in communication with the valve cavity and an atmosphere external to the valve cavity, and a second valve outlet in communication with the valve cavity and an atmosphere external to the valve cavity. The movable control element can be disposed in the valve cavity for selectively controlling the flow of fluid from the first and second vortex outlets and the atmosphere internal to the housing.

In some versions, a temperature sensing feature can be provided for controlling movement of the movable control element.

In some versions, the temperature sensing feature can be disposed in the valve cavity and in communication with the control element.

In some versions, the temperature sensing feature can include a reservoir of a control fluid that expands in response to an increase in a sensed temperature and contracts in response to a decrease in the sensed temperature.

In some versions, the valve body can further include a third valve outlet in communication with valve cavity and an atmosphere external to the valve cavity, the second valve outlet being disposed between the first and third valve outlets.

In some versions, the control element can include a stem and first and second plugs disposed toward opposite ends of the stem, each of the first and second plugs disposed in sealed sliding relationship with an internal surface of the valve cavity of the valve body of the flow control valve.

In some versions, the control element can be movable in the valve cavity between a first position, a second position, and a third position. When the control element occupies the first position, the first and second vortex outlets are both in fluid communication with the second valve outlet but not in fluid communication with the first and third valve outlets. When the control element occupies the second position, the first vortex outlet is in fluid communication with the first valve outlet but not the second and third valve outlets, and the second vortex outlet is in fluid communication with the second valve outlet but not the first and third valve outlets. When the control element occupies the third position, the first vortex outlet is in fluid communication with the second valve outlet but not the first and third valve outlets, and the second vortex outlet is in fluid communication with the third valve outlet but not the first and second valve outlets.

In some other versions, the control element can be movable in the valve cavity between a first position, a second position, and a third position. When the control element occupies the first position, the first and second valve inlets are sealed closed by the first and second valve plugs, respectively, of the control element such that the first and second vortex outlets are not in fluid communication with any of the first, second, and third valve outlets. When the control element occupies the second position, the first vortex outlet is in fluid communication with the first valve outlet but not the second and third valve outlets, and the second vortex outlet is in fluid communication with the second valve outlet but not the first and third valve outlets. When the control element occupies the third position, the first vortex outlet is in fluid communication with the second valve outlet but not the first and third valve outlets, and the second vortex outlet is in fluid communication with the third valve outlet but not the first and second valve outlets.

In some versions, the flow control valve can include a biasing member disposed in the valve cavity and biasing the control element toward the second position.

Yet another aspect of the present disclosure provides a process control apparatus, including a housing, a process control device disposed in the housing, and a temperature control device operably coupled to the housing for regulating a temperature of an atmosphere internal to the housing. The temperature control device can include a vortex tube and a flow control valve. The vortex tube can have a vortex inlet for receiving a compressed fluid, a first vortex outlet for discharging fluid from the vortex tube at a first temperature, and a second vortex outlet for discharging fluid from the vortex tube at a second temperature that is higher than the first temperature. The flow control valve can be coupled to the vortex tube and can include a valve body and a control element. The valve body can define a valve cavity, a control element disposed in the valve cavity, and a temperature sensing feature configured to sense a temperature of an atmosphere internal to the housing and configured to move the control element based on the sensed temperature between a plurality of positions to selectively direct the flow of fluid from the first and second vortex outlets to the atmosphere internal to the housing.

In some versions, the valve body can define a first valve inlet in communication with the valve cavity and the first vortex outlet of the vortex tube, a second valve inlet in communication with the valve cavity and the second vortex outlet of the vortex tube, a first valve outlet in communication with the valve cavity and an atmosphere external to the housing, and a second valve outlet in communication with the valve cavity and the atmosphere internal to the housing.

In some versions, the temperature sensing feature can be disposed in the flow control valve and the flow control valve is disposed in the housing.

In some versions, the temperature sensing feature can include a reservoir of a control fluid that expands in response to an increase in the temperature of the atmosphere internal to the housing and contracts in response to a decrease in the temperature of the atmosphere internal to the housing.

In some versions, the valve body can include a third valve outlet in communication with the valve cavity and the atmosphere external to the housing, the second valve outlet being disposed between the first and third valve outlets.

In some versions, the control element can include a stem and first and second plugs disposed toward opposite ends of the stem, each of the first and second plugs disposed in sealed sliding relationship with an internal surface of the valve cavity of the valve body of the flow control valve.

In some versions, the control element can be movable in the valve cavity between a first position, a second position, and a third position. When the control element occupies the first position, the first and second vortex outlets are both in fluid communication with the second valve outlet but not in fluid communication with the first and third valve outlets. When the control element occupies the second position, the first vortex outlet is in fluid communication with the first valve outlet but not the second and third valve outlets, and the second vortex outlet is in fluid communication with the second valve outlet but not the first and third valve outlets. When the control element occupies the third position, the first vortex outlet is in fluid communication with the second valve outlet but not the first and third valve outlets, and the second vortex outlet is in fluid communication with the third valve outlet but not the first and second valve outlets.

In some other versions, the control element can movable in the valve cavity between a first position, a second position, and a third position. When the control element occupies the first position, the first and second valve inlets are sealed closed by the first and second valve plugs, respectively, of the control element such that the first and second vortex outlets are not in fluid communication with any of the first, second, and third valve outlets. When the control element occupies the second position, the first vortex outlet is in fluid communication with the first valve outlet but not the second and third valve outlets, and the second vortex outlet is in fluid communication with the second valve outlet but not the first and third valve outlets. When the control element occupies the third position, the first vortex outlet is in fluid communication with the second valve outlet but not the first and third valve outlets, and the second vortex outlet is in fluid communication with the third valve outlet but not the first and second valve outlets.

In some versions, the flow control valve can include a biasing member disposed in the valve cavity and biasing the control element toward the second position.

DETAILED DESCRIPTION

Figure 1:
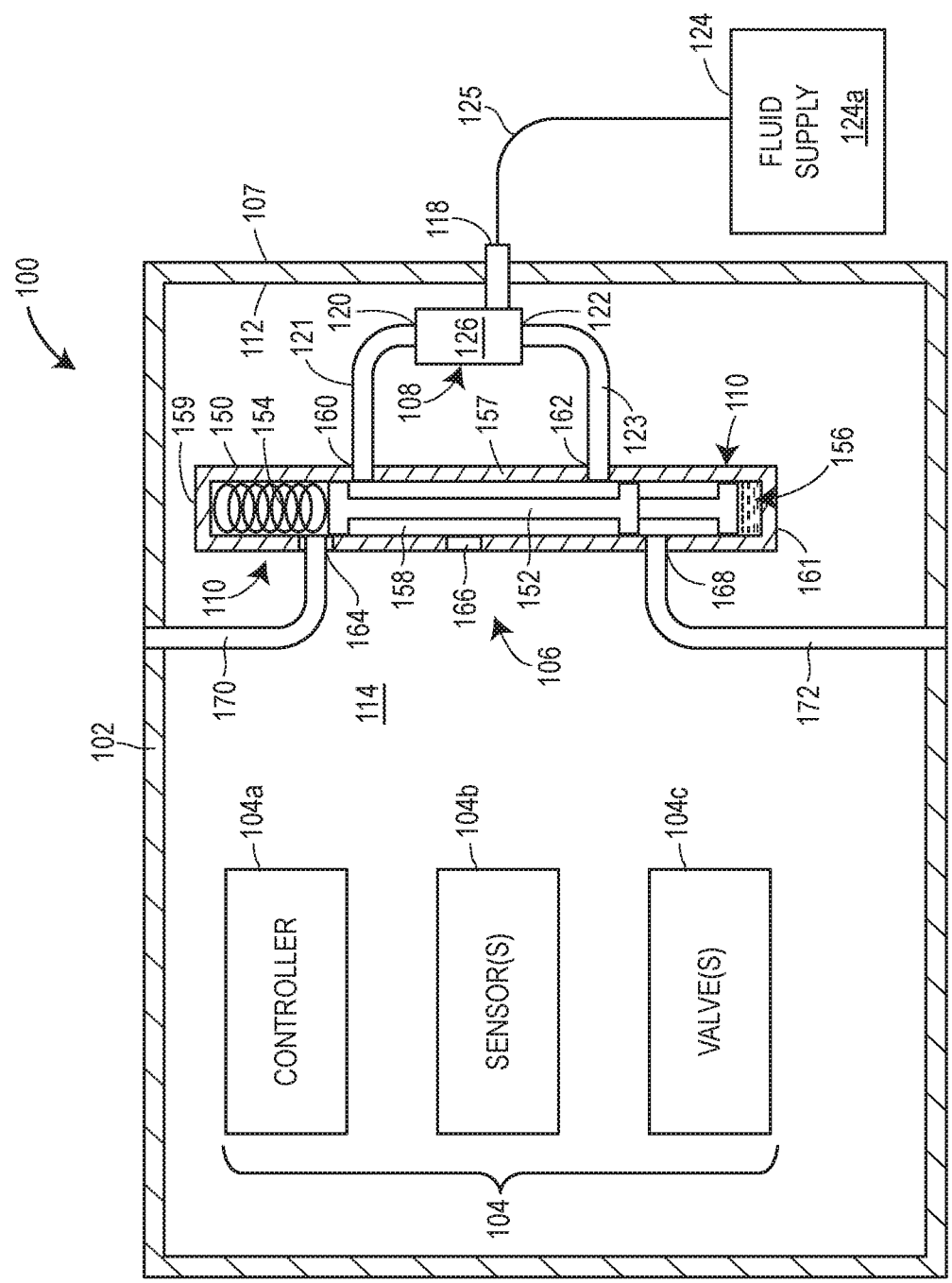
FIG. 1 is a cross-section of a schematic illustration of one embodiment of a process control apparatus constructed in accordance with the principles of the present disclosure including a temperature control device.

FIG. 1 depicts an exemplary embodiment of a process control apparatus 100 constructed in accordance with the principles of the present disclosure including a housing 102, a plurality of process control devices 104, and a temperature control device 106. As will be described more thoroughly, the temperature control device 106 is arranged and configured to monitor and control the temperature of an atmosphere internal to the process control apparatus 100. So configured, the atmosphere internal to the process control apparatus 100 can be managed to ensure usability even in extreme temperature conditions. For example, in some conditions, a temperature external to the apparatus 100 can be as low as −100° C. (−148° F.) or as high as 200° C. (392° F.). In other conditions, the temperature external to the apparatus of course could be even higher, or even lower. The invention is not limited by any specific environmental temperature range.

In one version, the process control apparatus 100 can include a digital valve controller (DVC) or any field device including those typically used in process control systems. In the version depicted in FIG. 1, the plurality of process control devices 104 includes a controller 104a, one or more sensors 104b, and one or more valves 106c, for example. Other process control devices could be included. Although not depicted in FIG. 1, each of the process control devices 104 can be connected to one or more of the other process control devices 104 via one or more wired, wireless, hydraulic, and/or pneumatic connections, for example.

The housing 102 in the example apparatus 100 fully encloses the process control devices 104 but, in other examples, the housing 102 may only partially enclose the process control devices 104, may enclose one or more additional control devices 104 or other components. The housing 102 may also include an insulation layer 107 covering at least a portion of the housing 102. The insulation layer 107 may be a thermal coating including one or more layers or may be a removable layer (e.g. a fabric jacket). The insulation layer 107 may be applied to an exterior surface 110 of the housing 102, as shown, and/or to an interior surface 112 of the housing 102.

In the example process control apparatus 100 depicted in FIG. 1, the temperature control device 106 is disposed within the housing 102 and includes a vortex tube 108 and a flow control valve 110. The temperature control device 106 is disposed entirely within the housing 102, but may also be located partly outside of the housing, and is coupled to the housing 102 to regulate a temperature of an interior cavity 114 of the housing 102, including a temperature of the plurality of process control devices 104. For example, in some embodiments, the vortex tube 108 can be outside of the housing 102 while the flow control valve 110 is inside of the housing 102. Or, in some embodiments, some portion of the flow control valve 110 can alternatively or also located outside of the housing 102.

The vortex tube 108 of the example apparatus 100 has a body 126, a vortex inlet 118, a first vortex outlet 120, and a second vortex outlet 122. In some versions, the vortex tube 108 can include a Ranque-Hilsch vortex tube, which is a common mechanical device that separates a supply compressed gas into hot and cold streams. In the disclosed example, a fluid supply 124 provides compressed or pressurized air to the vortex inlet 118 of the vortex tube 108. The vortex tube 108 then discharges a first stream of compressed air at a first temperature from the first vortex outlet 120, and a second stream of compressed air at a second temperature that is greater than the first temperature from the second vortex outlet 122. The air discharging from the first vortex outlet 120 can be considered "cold air" having a temperature as low as approximately −50° C. (−58° F.), and the air discharging from the second vortex outlet 122 can be considered "hot air" having a temperature as high as approximately 200° C. (392° F.). The temperatures of the "cold air" and "hot air" can be determined based on the pressure and flow rate of the air passing through the vortex tube 108.

In the depicted version, the first vortex outlet 120 is coupled to a first fluid delivery line 121 for delivering "cold air" to the flow control valve 110, and the second vortex outlet 122 is connected to a second fluid delivery line 123 for delivering "hot air" to the flow control valve 110. As also shown in FIG. 1, the fluid supply 124 provides compressed or pressurized fluid 124a to the vortex inlet 118, via a fluid supply line 125, such that the compressed or pressurized fluid 124a enters the vortex tube 108 perpendicular to the body 126 of the vortex tube 108. The fluid supply 124 may be a system dedicated to providing compressed or pressurized fluid 124a to the vortex tube 108. Alternatively, the fluid supply 124 may also provide compressed or pressurized fluid 124a to elsewhere in the process control system. In versions where the process control apparatus 100 includes a DVC, the fluid supply 124 can include the DVC itself in that, during operation, conventional DVCs bleed compressed air at a rate in the range of approximately 10 standard cubic feet per hour (SCFH) (4720 cc/min) to approximately 30 SCFH (14160 cc/min). Therefore, this bled off air can advantageously be re-purposed for use with the disclosed temperature control device 106.

Still referring to FIG. 1, the flow control valve 110 of the disclosed version of the temperature control device 106 includes a spool valve, but in other versions, any other type of suitable valve or any combination of valves could be used to achieve the desired objective. The flow control valve 110 in FIG. 1 includes a valve body 150, a control element 152, a biasing member 154, and a temperature sensing feature 156. The valve body 150 of the flow control valve 110 is a generally hollow cylindrical member including a cylindrical outer wall 157 and opposite first and second end walls 159, 161. The valve body 150 defines a cylindrical valve cavity 158, which contains the control element 152, a first valve inlet 160, a second valve inlet 162, a first valve outlet 164, a second valve outlet 166, and a third valve outlet 168. As shown, the first valve inlet 160 is connected to the first vortex outlet 120 via the first fluid delivery line 121, and the second valve inlet 162 is connected to the second vortex outlet 122 via the second fluid delivery line 123. Further, the first and third valve outlets 164, 168 are connected to first and second fluid outlet lines 170, 172, respectively, which are vented out of the housing 102 to an atmosphere external to the housing 102. In contrast, the second valve outlet 166 vents directly into the interior cavity 114 of the housing 102. In other versions, the second valve outlet 166 may vent into one or more fluid lines that communicate directly with one or more of the process control devices 104 to provide targeted temperature control, for example. This may be advantageous when less than all of the process control devices 104 or other components within the housing 102 are temperature sensitive.

As will be more thoroughly described, the temperature sensing feature 156 is disposed inside of the valve body 150 and the interior cavity 114 of the housing 102 and, is therefore, configured to sense a temperature of the atmosphere internal to the housing 102. Based on the sensed temperature, and as will be described more thoroughly below, the control element 152 is caused to occupy one of a first position (see, FIG. 2), a second position (see, FIG. 3) and a third position (see, FIG. 4) within the valve body 150 to selectively direct the flow of fluid from one or both of the vortex outlets 120, 122 of the vortex tube 108 into the interior cavity 114 of the housing 102 and/or out of the housing 102.

Figure 2:
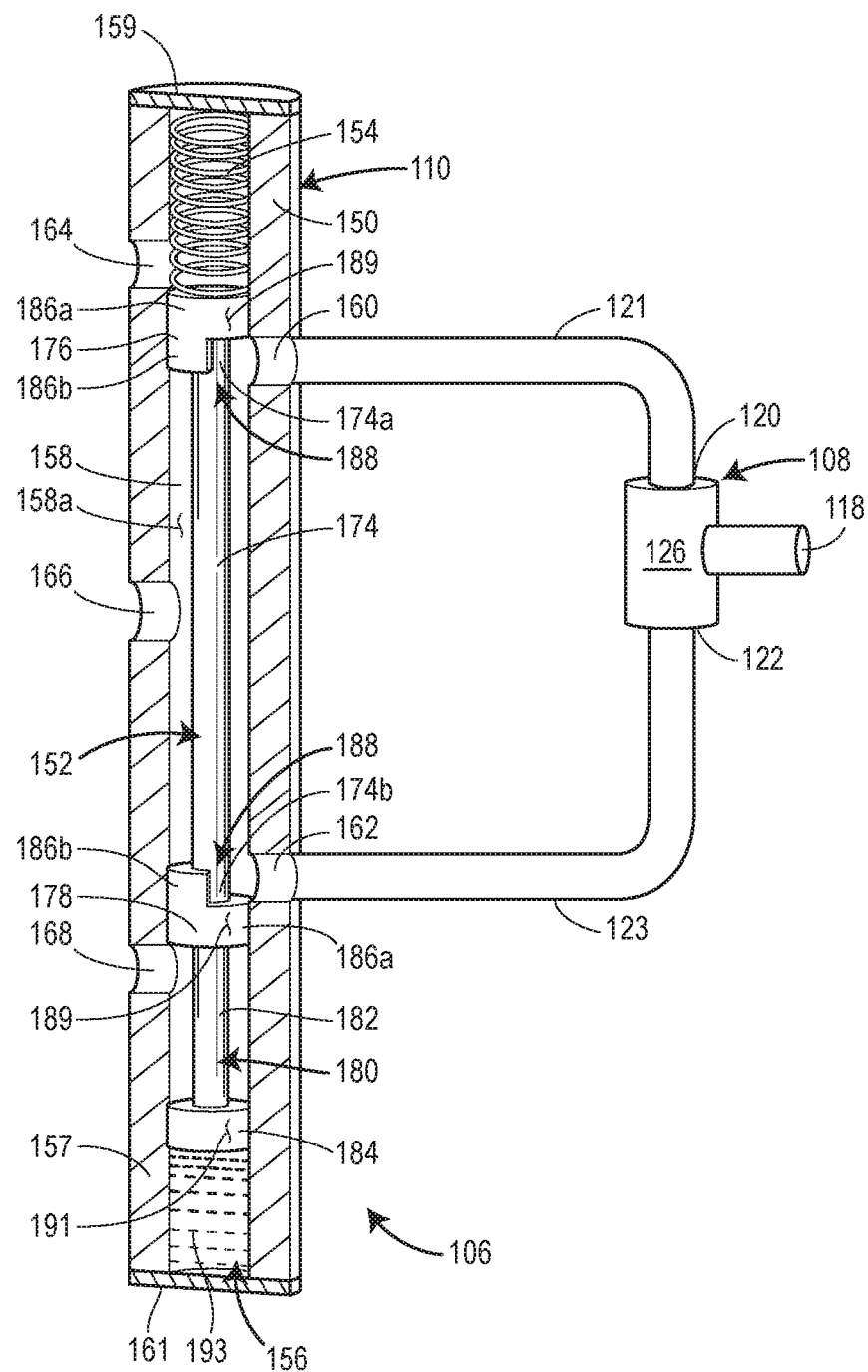
FIG. 2 is a detail view of one embodiment of the temperature control device of FIG. 1 showing a control element in a first position.

Referring now to FIG. 2, the flow control valve 110 will be described in more detail. As mentioned, the valve body 150 of the flow control valve 110 includes a cylindrical valve cavity 158 containing the control element 152. The control element 152 is a generally linear member including a stem 174, a first valve plug 176, a second valve plug 178, and a piston 180. The first and second valve plugs 176, 178 are rigidly fixed toward opposite ends 174a, 174b of the stem 174. The piston 180 includes a piston rod 182 and a piston plug 184. The piston rod 182 is rigidly fixed to the stem 174 and extends axially away from the stem 174 adjacent to its second end 174b. The piston plug 184 is rigidly fixed to an end of the piston rod 182 at a location spaced away from the second end 174b of the stem 174.

In the version depicted in FIG. 2, each valve plug 176, 178 of the control element 152 includes a cylindrical body portion 186a and a semi-cylindrical blocking portion 186b. In the depicted version, the body portion 186a and the blocking portion 186b have a common radius that is larger than a radius of the stem 174 and approximately equal to or smaller than a radius of the valve cavity 158 of the valve body 150. Moreover, in the depicted version, the body portion 186a has an axial dimension that is approximately equal to an axial dimension of the blocking portion 186b. As depicted, the semi-cylindrical blocking portions 186b extend in opposite axial directions toward each other and away from their corresponding body portions 186a. So configured, each valve plug 176, 178 defines a semi-cylindrical recess 188 opposite the stem 174 from each blocking portion 186b.

In the disclosed example, each of the body portions 186a of the first and second valve plugs 176, 178, and the piston plug 184, is shaped, sized and configured to occupy a sealed sliding relationship with an internal sidewall 158a of the valve cavity 158 of the flow control valve 110. To achieve this sealed sliding relationship, an outer cylindrical surface 189 of the body portions 186a of the valve plugs 176, 178, and an outer surface 191 of the piston plug 184, may include one or more sealing elements (not shown) such as an o-ring, a gasket, or other sealing feature, or alternatively, may simply be machined within tight tolerances with the internal surface 158a of the valve cavity 158 to provide an airtight seal within acceptable tolerances.

Still referring to FIG. 2, in addition to the control element 152 being disposed in the valve cavity 158, the biasing member 154 and the temperature sensing feature 156 are also disposed in the valve cavity 158. In the depicted version, the biasing member 154 can include a coil spring disposed in the valve cavity at a location between the first end wall 159 of the valve body 150 and the first valve plug 176. So configured, the biasing member 154 can apply a biasing force to the first valve plug 176, which urges the control element 152 away from the first end wall 159 and toward the second end wall 161.

The temperature sensing feature 156 of the present version includes a reservoir of a fluid 193 carried in the valve cavity 158 at a location between the second end wall 161 and the piston plug 184 of the piston 180 of the control element 152. The fluid 193 can be a temperature sensitive fluid that expands in response to an increase in temperature and contracts in response to a decrease in temperature. So configured, as a temperature of the fluid 193 increases, the fluid 193 expands and applies a force to the piston plug 184 urging the piston 180 and control element 152 away from the second end wall 161 and toward the first end wall 159, overcoming the bias of the biasing member 154. In contrast, as the temperature of the fluid 193 decreases, the fluid 193 contracts, which allows the biasing member 154 to urge the control element 152 away from the first end wall 159 and toward the second end wall 161. In some versions, the fluid 193 of the temperature sensing feature 156 can include any temperature sensitive medium including, for example, oil, wax, mercury, or any other fluid or non-fluid (e.g., a gas) capable of serving the intended objective.

As mentioned above, the control element 152 of the flow control valve 110 of the presently disclosed temperature control device 106 can occupy one of three distinct positions during operation. In FIG. 2, the control element 152 occupies the first position, wherein the first valve plug 176 is disposed in the valve cavity at a location between the first valve inlet 160 and the first valve outlet 164, and the second valve plug 178 is disposed in the valve cavity 158 at a location between the second valve inlet 162 and the third valve outlet 168. So configured, the first and second valve inlets 160, 162 are aligned with the recesses 188 defined by the first and second valve plugs 176, 178, respectively. As such, the first and second vortex outlets 120, 122 are both in fluid communication with the second valve outlet 166, via the valve cavity 158, but not in fluid communication with the first and third valve outlets 164, 168. Thus, "cold air" from the first vortex outlet 120 and "hot air" from the second vortex outlet 122 flow into the valve cavity 158 between the valve plugs 176, 178, across the stem 174, and mix prior to passing through, while passing through, and/or after passing through the second valve outlet 166 and into the interior cavity 114 of the housing 102. With the control element 152 occupying the first position as described, the temperature control device 106 serves to maintain an ambient temperature in the housing 102, which is useful when the operating temperature in the housing 102 is acceptable and no change in temperature is necessarily desired. However, in extreme weather conditions, it may be desirable to increase or decrease the temperature of the atmosphere internal to the housing 102.

Figure 3:
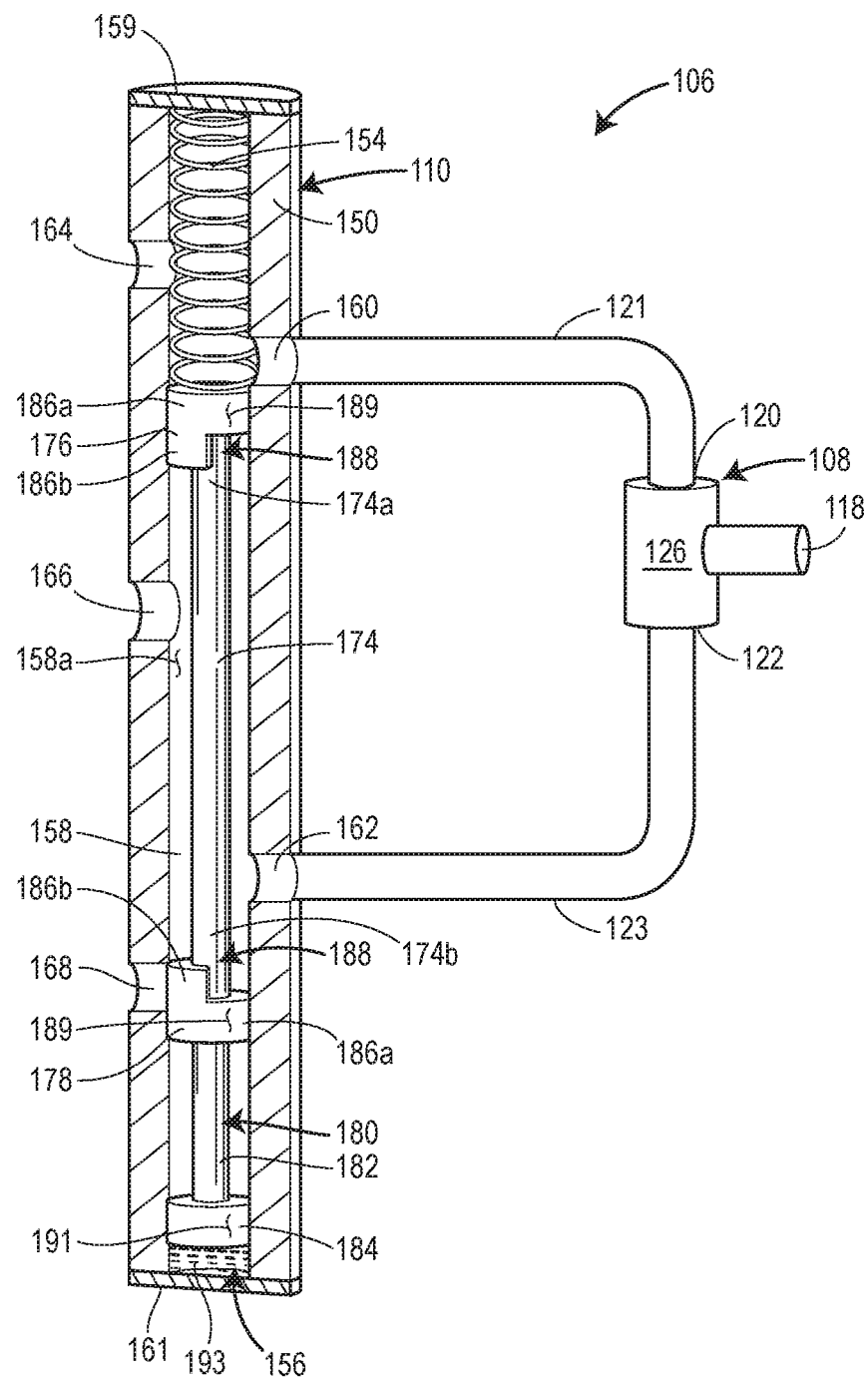
FIG. 3 is a detail view of the temperature control device of FIG. 1 showing the control element in a second position.

FIG. 3 depicts a situation where the temperature of the atmosphere internal to the housing 102 is lower than desired such that the fluid 193 in the temperature sensing feature 156 is contracted relative to the fluid 193 depicted in FIG. 2, for example. Accordingly, the biasing member 154 has urged the control element 152 toward the second end wall 161. In FIG. 3, the control element 152 occupies the second position, wherein the first valve plug 176 is disposed in the valve cavity 158 at a location between the first valve inlet 160 and the second valve outlet 166, and the second valve plug 178 is disposed in the valve cavity 158 at a location between the second valve inlet 162 and the third valve outlet 168. In fact, in the second position, the blocking portion 186b of the second valve plug 178 is positioned in front of and seals closed the third valve outlet 168.

As such, when the control element 152 occupies this second position, the first vortex outlet 120 is in fluid communication with the first valve outlet 164 but not the second and third valve outlets 166, 168, and the second vortex outlet 122 is in fluid communication with the second valve outlet 166 but not the first and third valve outlets 164, 168. Thus, "cold air" from the first vortex outlet 120 flows into the valve cavity 158, across the biasing member 154, passes through the first valve outlet 164 and ultimately vents out of the housing 102 via the first fluid outlet line 170 (shown in FIG. 1). "Hot air" from the second vortex outlet 122, however, flows into the valve cavity 158, across the stem 174, passes through the second valve outlet 164 and into the interior cavity 114 of the housing 102. As mentioned, the second valve plug 178 blocks the third valve outlet 168 so no air flows through the third valve outlet 168. Accordingly, with the control element 152 occupying the second position as described, the temperature control device 106 adds "hot air" to the interior cavity 114 of the housing 102 in order to maintain a sufficient operating temperature of the atmosphere internal to the housing 102.

Figure 4:
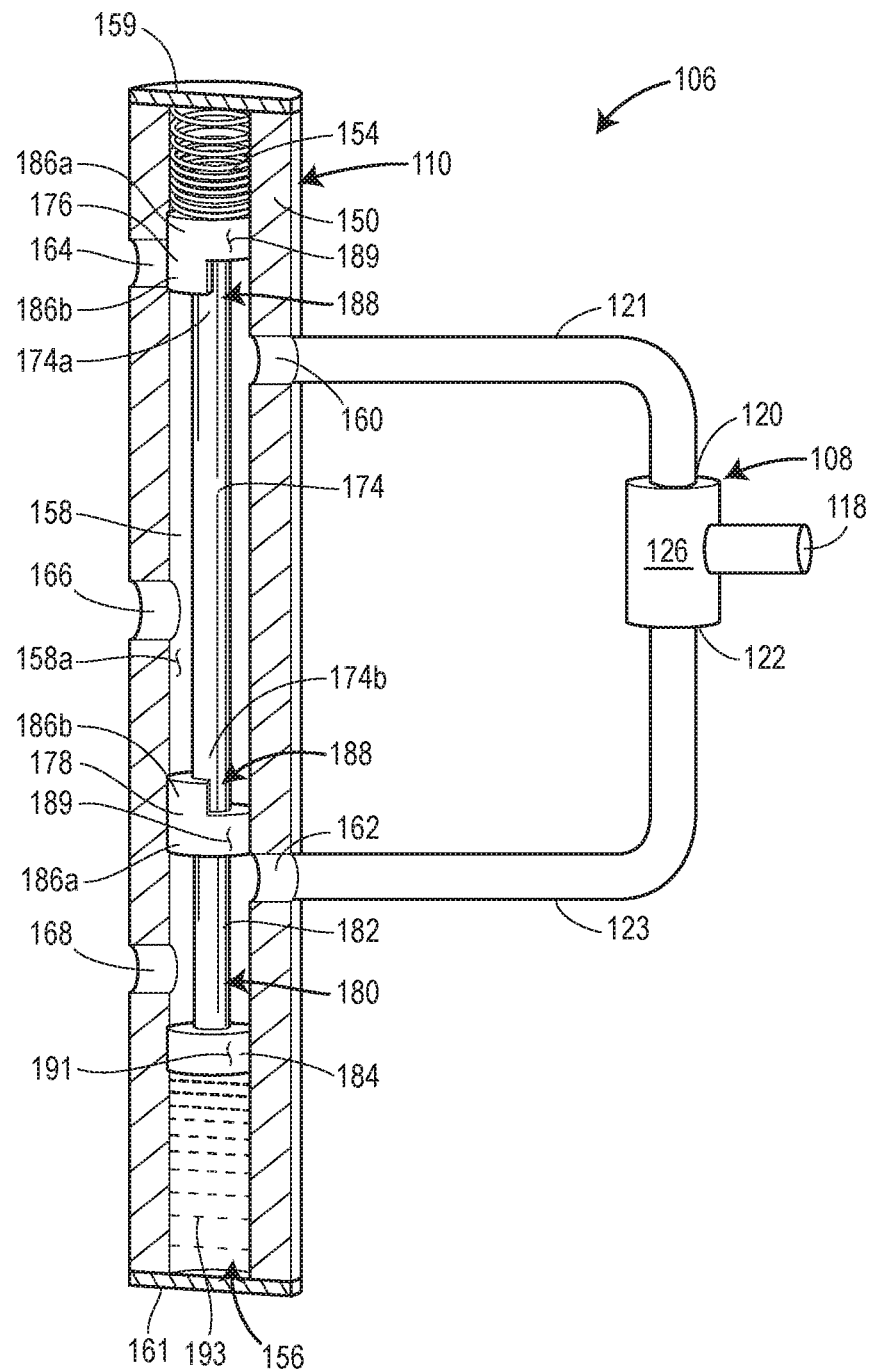
FIG. 4 is a detail view of the temperature control device of FIG. 1 showing the control element in a third position.

FIG. 4 depicts a situation where the temperature of the atmosphere internal to the housing 102 is higher than desired such that the fluid 193 in the temperature sensing feature 156 is expanded relative to the fluid 1933 depicted in FIG. 2, for example. Accordingly, the expanded fluid 193 has urged the control element 152 toward the first end wall 159 of the valve body 150, overcoming the bias force of the biasing member 154. In FIG. 4, the control element 152 occupies the third position, wherein the first valve plug 176 is disposed in the valve cavity 158 at a location between the first valve inlet 160 and the first valve outlet 164, and the second valve plug 178 is disposed in the valve cavity 158 at a location between the second valve inlet 162 and the second valve outlet 166.

In fact, in the third position, the blocking portion 186b of the first valve plug 176 is positioned in front of and seals closed the first valve outlet 164.

As such, when the control element 152 occupies the third position, the first vortex outlet 120 is in fluid communication with the second valve outlet 166 but not the first and third valve outlets 164, 168, and the second vortex outlet 122 is in fluid communication with the third valve outlet 168 but not the first and second valve outlets 164, 166. Thus, "cold air" from the first vortex outlet 120 flows into the valve cavity 158, across the stem 154, passes through the second valve outlet 166 and into the interior cavity 114 of the housing 102. "Hot air" from the second vortex outlet 122, however, flows into the valve cavity 158, across the piston 180, passes through the third valve outlet 168 and ultimately vented out of the housing 102 via the second fluid outlet line 172 (shown in FIG. 1). As mentioned, the first valve plug 176 blocks the first valve outlet 164 so no air flows through the first valve outlet 164. Accordingly, with the control element 152 occupying the third position as described, the temperature control device 106 adds "cold air" to the interior cavity 114 of the housing 102 in order to maintain a sufficient operating temperature of the atmosphere internal to the housing 102.

Based on the foregoing, it can be understood that while only three positions have been described for the control element 152, an infinite number of positions are possible between the second and third positions. For example, starting with FIG. 2, as the temperature of the atmosphere internal to the housing 102 decreases, the fluid 193 will naturally begin to contract such that the biasing member 154 will begin to urge the control element 152 toward the position depicted in FIG. 3, for example. But, it is possible that the temperature surrounding the temperature sensing feature 156 only decreases enough so that the fluid 193 partially contracts and the control element 152 moves partially toward the position depicted in FIG. 3. In this situation, the first valve plug 176 may not move entirely passed the first valve inlet 160 of the valve body 150 such that a lesser amount of "cold air" is ultimately mixed with the "hot air" supplied from the second valve inlet 162. Thus, it can be seen that the above-described temperature control device 106 can provide generally continuous monitoring and adjustment of the temperature internal to the housing 102 to ensure proper operation of the control devices 104 because the temperature sensing feature 156 is itself located in the interior cavity 114 of the housing 104 and capable of sending different changes in temperature.

As described above in relation to FIG. 2, when the temperature internal to the housing 102 is within acceptable limits for proper operation of the control devices 104, the foregoing temperature control device 106 can provide for a first position of the control element 152 wherein "cold air" and "hot air" mix in the valve cavity 158 and flow into the housing 102. When a continuous supply of compressed gas is provided to the vortex tube 108, this arrangement results in the temperature control device 106 providing a continuous supply of ambient temperature air to the interior cavity 114 of the housing 102. This is mainly achieved through the configuration of the first and second valve plugs 176, 178, which define semi-cylindrical recesses 188 in alignment with the first and second valve inlets 160, 162 such that communication is maintained between the vortex outlets 120, 122 and the interior cavity 114 of the housing 102. This configuration works well when there is a continuous supply of compressed gas to the vortex tube 108, as is the case when the process control apparatus 100 itself includes a DVC, for example, and this continuous supply must be bled off of the DVC regardless.

Figure 5:
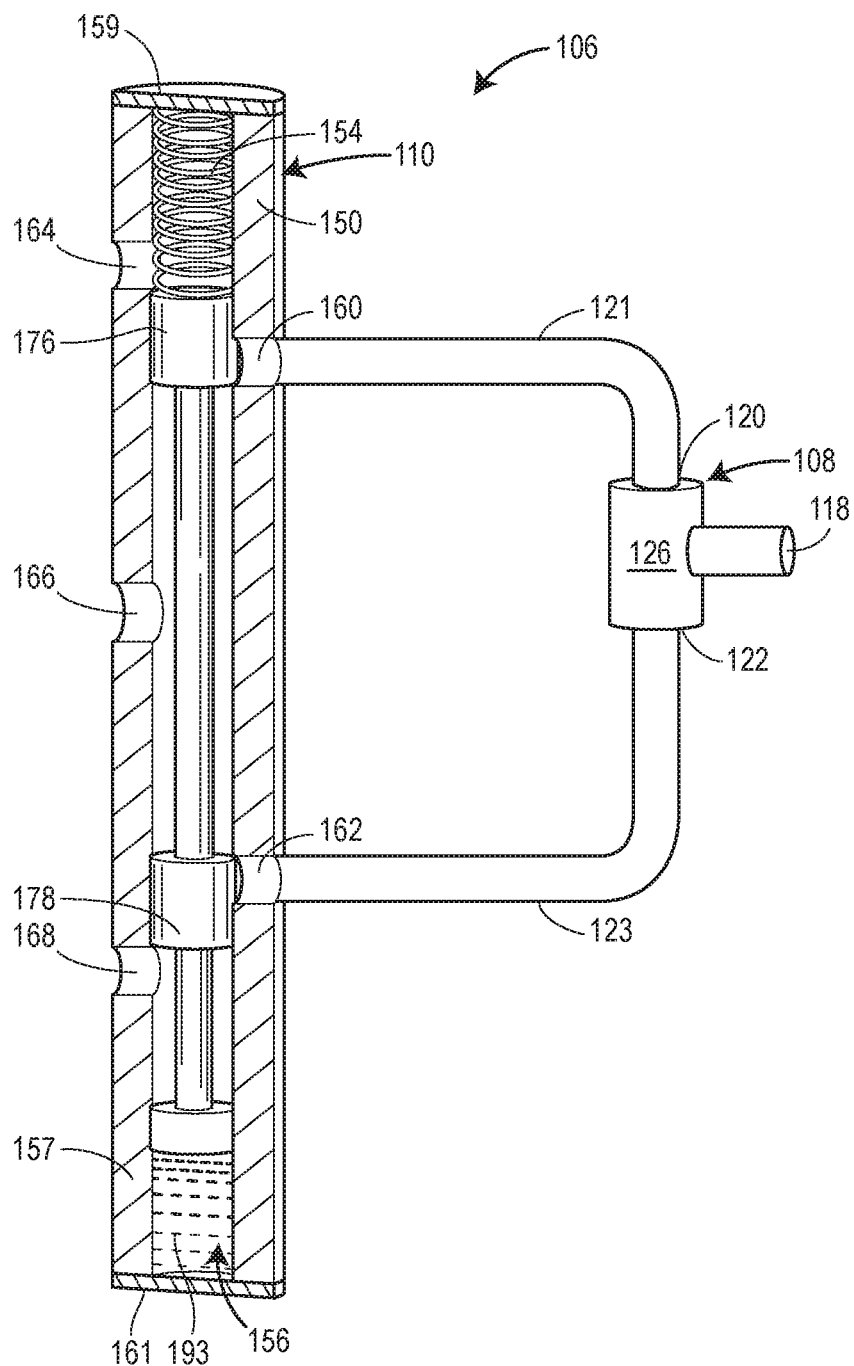
FIG. 5 is a detail view of another embodiment of the temperature control device of FIG. 1 showing a control element in a first position.

In other situations, however, where the fluid supply 124 originates from a dedicated supply, it may be beneficial to cease the flow of compressed air when the temperature within the interior cavity 114 of the housing 102 is within acceptable operating limits. FIG. 5 depicts one alternative temperature control device 106 that is capable of performing this function. The temperature control device 106 in FIG. 5 is substantially similar to the temperature control device 106 described with reference to FIGS. 2-4 and, as such, like features will be identified by like reference numerals. In fact, the only distinction between the temperature control device 106 in FIG. 5 and the temperature control device 106 in FIGS. 2-4 is the shape and configuration of the first and second valve plugs 176, 178. All other features are identical. That is, the first and second valve plugs 176, 178 of the control element 152 in FIG. 5 include cylindrical body portions 186 only, and do not include any semi-cylindrical blocking portions or recesses. Additionally, the body portions 196 of the valve plugs 176, 178 in FIG. 5 have an axial dimension that is approximately equal to the combined axial dimensions of the body and blocking portions 186a, 186b of the valve plugs 176, 178 in FIGS. 2-4. As such, an overall axial dimension of the valve plugs 176, 178 in FIG. 5 is the same as an overall axial dimension of the valve plugs 176, 178 in FIGS. 2-4.

With the control element 152 configured as described in FIG. 5, the first and second valve plugs 176, 178 block off and close the first and second valve inlets 160, 162, respectively, when the temperature in the interior cavity 114 of the housing 102 is acceptable and the control element 152 occupies the first position. Accordingly, no compressed air passes through the temperature control device 106, which can help preserve the fluid supply 124, reduce waste, and conserve energy. While the operation of the flow control valve 110 in FIG. 5 is different from those previously described while the control element 152 occupies the first position, operation with the control element 152 in the second and third positions is the same as that described above.

While each of the foregoing embodiments has been described as including a flow control valve with first, second, and third valve outlets 164, 166, 168, in some versions the flow control valve 110 may take on a form different than a spool valve (e.g., one or more rotary ball valves, globe style sliding stem valves, poppet valves, etc.) such that only the first and second valve outlets are necessary.

While the foregoing has described the temperature control device 106 of the present disclosure as including a vortex tube 108 and flow control valve 110 fluidly connected by fluid lines 121 and 123, in other versions the vortex tube 108 and flow control valve 110 could be constructed of a single unitary component such that no external fluid lines are required. For example, in one version, the vortex tube 108 and flow control valve 110 could be constructed from a single piece of material machined, forged, or cast into the desired construct such that any communication between the vortex outlets 120, 122 and the valve inlets 160, 162 would occur within the single piece of material either directly or via internal flow paths. Similarly, while the flow control valve 110 has been disclosed as being connected to fluid outlet lines 170, 172 for venting air out of the housing 102, other embodiments of the apparatus 100 can be constructed in a manner that the first and third vortex outlets 164, 168 of the flow control valve 110 vent directly out of the housing 102 without the requirement for external fluid outlet lines 170, 172.

As mentioned above, the temperatures of the "cold air" and "hot air" discharging from the vortex tube 108 are dependent on the pressure and flow rate of air passing through the vortex tube 108. Thus, adjusting the pressure and/or flow rate can adjust the temperatures. Moreover, as mentioned above, the example apparatus 100 includes the controller 104a coupled to one or more sensors 104b. In some embodiments, the one or more sensors 104b can include sensors to measure a temperature of the interior cavity 114 of the housing 102, an operating temperature of one or more of the process control devices 104, and/or temperatures outside of the housing 102, for example. In operation, and based on the sensed temperature(s), the controller 104a may adjust the flow of fluid through the vortex inlet 118 of the vortex tube 108, via the fluid supply 124, to adjust, control or regulate the temperature of the fluid exiting the vortex tube 108. The temperature of the fluid and the flow rate of fluid from the vortex tube 108 into the interior cavity 114 of the housing 102 may, for example, be adjusted by adjusting a valve (not shown) between the fluid supply 124 and the vortex inlet 118. Decreasing the flow rate through the vortex tube 108 increases the temperature of the fluid exiting the first and second vortex outlets 120, 122 of the vortex tube 108, while increasing the flow rate decreases the temperatures of the fluid exiting the first and second vortex outlets 120, 122 of the vortex tube 108.

The example controller 104a may be implemented by hardware, software, firmware and/or any combination of hardware, software and/or firmware. Thus, the example controller 104a could be implemented by one or more analog or digital circuit(s), logic circuits, programmable processor(s), application specific integrated circuit(s) (ASIC (s)), programmable logic device(s) (PLD(s)) and/or field programmable logic device(s) (FPLD(s)). The example controller 104a can include a tangible computer readable storage device or storage disk such as a memory, a digital versatile disk (DVD), a compact disk (CD), a Blu-ray disk, etc. storing the software and/or firmware. Further still, the example controller 104a may include one or more elements, processes and/or devices and/or may include more than one of any or all of the elements, processes and devices.

Additionally, the example controller 104a may communicate with the one or more of the sensors 104b or valves 104c, or valve between the fluid supply 124 and the vortex inlet 118 using any type of wired connection (e.g., a databus, a USB connection, etc.) or a wireless communication mechanism (e.g., radio frequency, infrared, etc.) using any past, present or future communication protocol (e.g., Bluetooth, USB 2.0, USB 3.0, etc.). Further, one or more of the controller 104a or the valves 104c may communicate with each other using such wired connection or wireless communication mechanism.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A temperature control device for controlling a temperature of a process control apparatus, the temperature control device comprising:
 a vortex tube having a vortex inlet for receiving a compressed fluid, a first vortex outlet for discharging fluid from the vortex tube at a first temperature, and a second vortex outlet for discharging fluid from the vortex tube at a second temperature that is higher than the first temperature, a flow control valve coupled to the vortex tube to selectively direct the flow of fluid from the first and second vortex outlets of the vortex tube, the flow control valve comprising:

a valve body defining a valve cavity, a first valve inlet in communication with the valve cavity and the first vortex outlet of the vortex tube, a second valve inlet in communication with the valve cavity and the second vortex outlet of the vortex tube, a first valve outlet extending through a sidewall of the valve body and in communication with the valve cavity and an atmosphere external to the valve cavity, and a second, separate valve outlet extending through the sidewall of the valve body and in communication with the valve cavity and an atmosphere external to the valve cavity; and a movable control element disposed in the valve cavity for selectively controlling the flow of fluid from the first and second vortex outlets and the atmosphere internal to a housing.

2. The device of claim 1, further comprising a temperature sensing feature for controlling movement of the movable control element.

3. The device of claim 2, wherein the temperature sensing feature is disposed in the valve cavity and in communication with the movable control element.

4. The device of claim 2, wherein the temperature sensing feature comprises a reservoir of a control fluid that expands in response to an increase in a sensed temperature and contracts in response to a decrease in the sensed temperature.

5. The device of claim 1, wherein the valve body further comprises a third valve outlet in communication with valve cavity and an atmosphere external to the valve cavity, the second valve outlet being disposed between the first and third valve outlets.

6. The device of claim 5, wherein the movable control element comprises a stem and first and second plugs disposed toward opposite ends of the stem, each of the first and second plugs disposed in sealed sliding relationship with an internal surface of the valve cavity of the valve body of the flow control valve.

7. The device of claim 6, wherein the movable control element is movable in the valve cavity between a first position, a second position, and a third position, wherein (a) when the movable control element occupies the first position, the first and second vortex outlets are both in fluid communication with the second valve outlet but not in fluid communication with the first and third valve outlets, and (b) when the movable control element occupies the second position, the first vortex outlet is in fluid communication with the first valve outlet but not the second and third valve outlets, and the second vortex outlet is in fluid communication with the second valve outlet but not the first and third valve outlets, and (c) when the movable control element occupies the third position, the first vortex outlet is in fluid communication with the second valve outlet but not the first and third valve outlets, and the second vortex outlet is in fluid communication with the third valve outlet but not the first and second valve outlets.

8. The apparatus of claim 6, wherein the movable control element is movable in the valve cavity between a first position, a second position, and a third position, wherein (a) when the movable control element occupies the first position, the first and second valve inlets are sealed closed by the first and second valve plugs, respectively, of the movable control element such that the first and second vortex outlets are not in fluid communication with any of the first, second, and third valve outlets, and (b) when the movable control element occupies the second position, the first vortex outlet is in fluid communication with the first valve outlet but not the second and third valve outlets, and the second vortex outlet is in fluid communication with the second valve outlet but not the first and third valve outlets, and (c) when the movable control element occupies the third position, the first vortex outlet is in fluid communication with the second valve outlet but not the first and third valve outlets, and the second vortex outlet is in fluid communication with the third valve outlet but not the first and second valve outlets.

9. The apparatus of claim 6, wherein the flow control valve further comprises a biasing member disposed in the valve cavity and biasing the movable control element toward the second position.

10. A process control apparatus, comprising:
a housing;
a process control device disposed in the housing; and
a temperature control device operably coupled to the housing for regulating a temperature of an atmosphere internal to the housing, the temperature control device comprising a vortex tube and a flow control valve,
the vortex tube having a vortex inlet for receiving a compressed fluid, a first vortex outlet for discharging fluid from the vortex tube at a first temperature, and a second vortex outlet for discharging fluid from the vortex tube at a second temperature that is higher than the first temperature,
the flow control valve coupled to the vortex tube and comprising a valve body defining a valve cavity, a control element disposed in the valve cavity, a first valve outlet extending through a sidewall of the valve cavity and in communication with the valve cavity and an atmosphere external to the housing, and a second, separate valve outlet extending through the sidewall of the valve body and in communication with the valve cavity and the atmosphere internal to the housing, and a temperature sensing feature configured to sense a temperature of an atmosphere internal to the housing and configured to move the control element based on the sensed temperature between a plurality of positions to selectively direct the flow of fluid from the first and second vortex outlets to the atmosphere internal to the housing.

11. The apparatus of claim 10, wherein the valve body defines a first valve inlet in communication with the valve cavity and the first vortex outlet of the vortex tube, a second valve inlet in communication with the valve cavity and the second vortex outlet of the vortex tube.

12. The apparatus of claim 11, wherein the valve body further comprises a third valve outlet in communication with the valve cavity and the atmosphere external to the housing, the second valve outlet being disposed between the first and third valve outlets.

13. The apparatus of claim 11, wherein the control element comprises a stem and first and second plugs disposed toward opposite ends of the stem, each of the first and second plugs disposed in sealed sliding relationship with an internal surface of the valve cavity of the valve body of the flow control valve.

14. The apparatus of claim 13, wherein the control element is movable in the valve cavity between a first position, a second position, and a third position, wherein
    (a) when the control element occupies the first position, the first and second valve inlets are sealed closed by the first and second valve plugs, respectively, of the control element such that the first and second vortex outlets are not in fluid communication with any of the first, second, and third valve outlets, and
    (b) when the control element occupies the second position, the first vortex outlet is in fluid communication with the first valve outlet but not the second and third valve outlets, and the second vortex outlet is in fluid communication with the second valve outlet but not the first and third valve outlets, and
    (c) when the control element occupies the third position, the first vortex outlet is in fluid communication with the second valve outlet but not the first and third valve outlets, and the second vortex outlet is in fluid communication with the third valve outlet but not the first and second valve outlets.

15. The apparatus of claim 10, wherein the temperature sensing feature is disposed in the flow control valve and the flow control valve is disposed in the housing.

16. The apparatus of claim 10, wherein the temperature sensing feature comprises a reservoir of a control fluid that expands in response to an increase in the temperature of the atmosphere internal to the housing and contracts in response to a decrease in the temperature of the atmosphere internal to the housing.

17. The apparatus of claim 10, wherein the control element is movable in the valve cavity between a first position, a second position, and a third position, wherein
    (a) when the control element occupies the first position, the first and second vortex outlets are both in fluid communication with the second valve outlet but not in fluid communication with the first valve outlet and a third valve outlet, and
    (b) when the control element occupies the second position, the first vortex outlet is in fluid communication with the first valve outlet but not the second and third valve outlets, and the second vortex outlet is in fluid communication with the second valve outlet but not the first and third valve outlets, and
    (c) when the control element occupies the third position, the first vortex outlet is in fluid communication with the second valve outlet but not the first and third valve outlets, and the second vortex outlet is in fluid communication with the third valve outlet but not the first and second valve outlets.

18. The apparatus of claim 10, wherein the flow control valve further comprises a biasing member disposed in the valve cavity and biasing the control element toward a second position.

* * * * *